United States Patent [19]

Ow et al.

[11] Patent Number: 5,785,809
[45] Date of Patent: Jul. 28, 1998

[54] BIOLOGICAL DE-INKING METHOD

[75] Inventors: Steven Say-kyoun Ow; Tae Jin Eom, both of Daejonjikhal-shi, Rep. of Korea

[73] Assignee: KRICT, Rep. of Korea

[21] Appl. No.: 239,313

[22] Filed: May 6, 1994

Related U.S. Application Data

[63] Continuation-in-part of Ser. No. 518,935, May 4, 1990, abandoned.

[30] Foreign Application Priority Data

May 16, 1989 [KR] Rep. of Korea ............... 6514/1989

[51] Int. Cl.$^6$ ........................................... D21F 5/02
[52] U.S. Cl. ................................... 162/5; 162/72
[58] Field of Search ................. 162/1, 5, 72; 435/264, 435/274, 277, 278

[56] References Cited

U.S. PATENT DOCUMENTS

| | | | |
|---|---|---|---|
| 3,966,543 | 6/1976 | Cayle et al. | 162/158 |
| 4,450,043 | 5/1984 | Schulz | 435/278 |
| 4,561,933 | 12/1985 | Wood et al. | 162/5 |
| 4,923,565 | 5/1990 | Fuentes et al. | 435/277 |
| 4,980,023 | 12/1990 | Salkinoja-Salonen | 162/135 |
| 5,110,412 | 5/1992 | Fuentes et al. | 162/13 |

FOREIGN PATENT DOCUMENTS

| | | | |
|---|---|---|---|
| 656395 | 1/1963 | Canada | 162/5 |
| 0 262 040 | 3/1988 | European Pat. Off. | |
| Sho 52-20563 | 6/1977 | Japan . | |
| 59-9299 | 1/1984 | Japan | 162/5 B |
| 59-223390 | 12/1984 | Japan | 162/5 |
| 63-59494 | 3/1988 | Japan . | |
| 2-80683 | 3/1990 | Japan . | |
| 2231595 | 11/1990 | United Kingdom | 162/5 B |

*Primary Examiner*—Karen M. Hastings
*Attorney, Agent, or Firm*—Jones & Askew, LLP

[57] ABSTRACT

A method of de-inking wastepaper by pulping the paper in the presence of an enzyme is disclosed. The enzyme dislodges the ink particles from the paper fibers. The preferred enzymes are the acid resistant carbohydrases. The de-inking medium is an aqueous solution of the enzyme, preferably maintained at a pH less than about 7 and at a temperature between about 20° C. and about 60° C. No conventional chemical de-inking agents are required. The dislodged ink particles may be removed by any conventional method, such as flotation or washing.

20 Claims, No Drawings

BIOLOGICAL DE-INKING METHOD

BACKGROUND OF THE INVENTION

This is a continuation-in-part application of U.S. patent application Ser. No. 07/518,935, filed May 4, 1990, co-pending herewith and later abandoned.

1. Field of the Invention

This invention relates to a process for reclaiming useful pulp fibers from wood-containing or wood-free wastepaper by a biological method in the de-inking process.

2. Description of the Background

De-inking of pulp fibers is essentially a laundering or cleaning process in which the ink is considered to be the dirt.

Chemicals, along with heat and mechanical energy, are used to dislodge the ink particles from fibers and to disperse them in the aqueous medium. The ink particles are then separated from the pulp fibers, either by washing or flotation or by using a modern hybrid process that combines washing and flotation.

The chemicals used for the conventional de-inking process are surfactants which function as detergents to remove ink from the fiber, as dispersants to keep the ink particles dispersed and prevent redeposition on the fibers, and foaming agents in the froth flotation of ink particles.

A typical surfactant is a long chain molecule with a hydrophobic part on one end and a hydrophilic part on the other end. The hydrophobic part may consist of fatty acid, fatty alcohol, alkylphenols or other oil-soluble surfactants.

The hydrophilic part in the de-inking surfactant usually consists of anionic molecules, such as carboxylic acid salts or sulfonic acid salts and nonionic molecules, such as polyoxyethylenated chains.

The typical surfactants commonly used in the washing and froth flotation de-inking processes are: sodium and potassium salts of straight-chain fatty acids (soaps), linear alkylbenzenesulfonates (LAS), long-chain fatty alcohols, polyoxyethoxylated alkylphenols, alkylphenol ethoxylates, and polyoxyethoxylated straight-chain alcohols.

A major disadvantage of using these surfactants in the de-inking process is excess foaming in the subsequent pulp stock flow and paper making process lines. Moreover, some of the above surfactants are resistant to biodegradation in the effluent treatment stages causing a serious environmental problem.

In the froth flotation de-inking process, collector is added to agglomerate ink into large particles and attach them to the air bubbles. Collectors are required for effective flotation and are usually anionic long-chain fatty acid soaps. Fatty acid collectors are precipitated with calcium ions to form larger, insoluble ink particles and collector particles. With injection of air in the flotation cells, the agglomerated ink particles adhere to the bubbles, rise to the surface and are skimmed off from the system.

Major disadvantages of the flotation method using the fatty acid collector are a pitch deposition and calcium scaling problems in the subsequent stock lines and paper-making process equipment. Besides surfactants, other chemicals employed are caustic soda, sodium silicate, metal ion chelating agents and hydrogen peroxide.

The hydrogen peroxide bleaching agent has to be added in order to prevent pulp yellowing caused by the addition of caustic soda and to improve the brightness of pulp fibers.

With advances in modern printing and photocopying technology, conventional de-inking with the aid of surfactants encounters serious problems because the wastepaper is printed with the use of heavily coated, highly polymerized or non-impact inks, such as ultraviolet, heatset, Xerox, laser and ink jet. These inks usually contain cured polymer resins which bind ink particles so strongly on the fiber surface that it is impossible to dislodge the inks completely during the wastepaper defiberizing (pulping) stage with the conventional de-inking chemicals. Excess heat and mechanical energy are also required along with the ineffective conventional chemicals.

Furthermore, in the conventional flotation de-inking process for newsprint wastepaper, a major technical problem has to do with the fact that fine ink particles are embedded in the fiber bundles and between fibrils which are almost impossible to be removed from the fibers by a washing and/or flotation process.

SUMMARY OF THE INVENTION

This invention provides a new and much improved de-inking method which is effective for newsprint as well as wood-free printed wastepaper, such as whiteledger, laser printed, xerographic copypaper and computer printout wastepaper.

The de-inking method of the present invention is to remove ink particles by the use of the biological activity of enzymes on the cellulose fiber surface and the dispersing function of enzyme protein on ink particles.

In contrast to the conventional method, no alkali or de-inking surfactants are required. In the froth flotation process, the fatty acid collectors are not required. Since caustic soda is not used in the newsprint de-inking, a hydrogen peroxide bleaching agent is also not required for preventing yellowing .

The elimination of the fatty acid collector in this biological de-inking process will solve the persistent pitch and scale deposition problem associated with the conventional flotation process using the fatty acid type soap and calcium salts and silicates.

DESCRIPTION OF THE PREFERRED EMBODIMENT

The wastepaper, such as old newsprint, is disintegrated in a conventional pulper (consistency 4–7%) or in a high consistency pulper (consistency 12–15%) at a water temperature ranging from about 20° C. up to 60° C. The addition level of enzyme is about 0.005% to about 5.0% by weight based on dry weight of wastepaper. The pH of the stock slurry is in the range of 3.0 to 8.0, preferably, below about 7.0, and preferably between about of 3.0 and 7.0.

As compared to the conventional pulping process using caustic and surfactants, the pulping in the presence of enzyme can be completed in a relatively short period and ink particles are completely separated from the fiber surface and dispersed well. The dispersed inks are removed out of the pulp fibers by using the conventional washing process equipment, such as vibrating screen and drum washers without the aid of detergent surfactants in single and multistages. The ink particles dispersed with the action of enzyme protein can be also selectively removed out of the diluted pulp slurry with conventional flotation equipment in which air is injected or drawn into the pulp to provide bubbles to pick up the particles. No fatty acid collector is required in the case of waste newsprint. A small amount of fatty acid collector may be added to enhance the ink removal efficiency in the case of laser-printed wastepaper.

Among enzymes which can be used in the method are the carbohydrases and particular enzymes, such as cellulase, hemicellulase, pectinase and mixtures thereof. Examples of commercially available cellulases useful in these methods are those derived from *Trichoderma viride* and *Aspergillus niger*. These and other acid resistant enzymes may be used alone or as mixtures.

This biological de-inking process lowers pulping energy requirements to a large extent (almost 50% reduction) since the addition of enzyme results in a substantial reduction in pulping time as compared to the pulping in the absence of enzyme. The observed faster and easier pulping in the presence of enzyme may be attributed to the unique biological activity of the enzyme which is effective to debond the fiber bonding and dislodge the inks bonded on the fiber surface as well as within the fiber bundles or between the fibrils. A partial enzymatic hydrolysis of cellulose within the micro structure of the fiber surface may occur during the pulping stage. Because of this biological activity of the enzyme, the fine ink particles embedded within fiber bundles, fibrils and fines which have been impossible to be taken out by the conventional de-inking chemicals in the case of old newsprint de-inking are removed.

According to this biological de-inking method of old newsprint, the addition of hydrogen peroxide to prevent fiber yellowing is not required. This results in a substantial reduction of de-inking chemical cost as compared to the conventional de-inking process using caustic soda, hydrogen peroxide, chelating agents and sodium silicates.

It should be pointed out that the physical strength properties of the resulting pulp fiber prepared by this inventive method are found to be higher than those of the corresponding pulp prepared by the conventional method in addition to the much higher resulting pulp brightness. The enzyme addition does not appear to degrade the fiber strength, but rather improves the fiber strength for reasons not presently known.

To more fully illustrate the present invention, the following non-limiting examples are presented.

DE-INKING OF OLD NEWSPRINT WITH A CELLULOLYTIC-ENZYME

Example 1

A sample of old newsprint wastepaper was added to the pulper which was filled with 40° C. water at a consistency of 4% and a cellulase (enzyme) was dissolved at the dosage level of 0.1% based on oven dry weight of wastepaper. The wastepaper was soaked for 10 minutes and then disintegrated for 5 minutes. After a complete disintegration of wastepaper, one half of the pulp slurry was diluted to 1% consistency.

The diluted pulp slurry was moved to the air flotation cell and then the dispersed ink particles were removed out of the pulp slurry by skimming off the ink particles froth out of the cell while injecting air through a porous plate. The flotation time for the complete removal of the ink froth was one minute.

The other half of the pulp slurry was washed on a laboratory vibrating screen to remove the dispersed ink particles.

The resulting recycled pulp fibers obtained by the flotation and the washing step were evaluated for pulp brightness and mechanical strength properties.

Comparative Example

To compare the foregoing enzyme-treated de-inked pulp to the conventional de-inked pulp, the same sample of wastepaper was treated in the pulper with addition of 1.0% sodium hydroxide, 0.3% hydrogen peroxide, 3% sodium silicate solution (water glass) and 0.8% of SERFAX MT-90 ( fatty acid soap) and 0.2% IGEPAL-660 (biodegradable nonionic surfactant marketed by GAF Corporation) based on oven dry weight of wastepaper. The pulping time was 10 minutes for a complete disintegration. After diluting to 1% consistency, the dispersed ink particles were removed by the flotation method with the laboratory flotation cell as described above.

TABLE 1

| Comparison of properties of recycled pulp by the method of the present invention and the conventional method | | | | | | |
|---|---|---|---|---|---|---|
| | Brightness (%) | | Tensile Index (N.m/g) | | Tear Index (mN.m/g) | |
| | KONP | AONP | KONP | AONP | KONP | AONP |
| cellulase enzyme | 47.1 | 45.2 | 28.9 | 32.4 | 11.7 | 13.6 |
| after washing | 50.3 | 48.6 | 29.3 | 32.9 | 11.8 | 14.1 |
| conventional method | 45.1 | 38.4 | 30.1 | 32.8 | 10.8 | 13.1 |

KONP: Korean old newspaper
AONP: American old newspaper

As shown in Table 1, the brightness of the pulp de-inked with enzyme was much higher than that of the pulp de-inked with the conventional chemicals and the mechanical strength of the pulp de-inked with enzyme was also superior to the pulp de-inked with the fatty acid collector and the dispersant (IGEPAL-660). Microscopic observation revealed that the pulp prepared by the present invention contained more long fiber fractions, has smoother fiber surface and looks less mechanically damaged.

As can be seen from the data in Table 1, the enzyme treated pulp gave cleaner and brighter pulp with the washing as compared to the flotation ink removal using the conventional method.

ENZYME CONCENTRATION EFFECT ON DISINTEGRATION TIME

The enzyme addition also appeared to accelerate the wastepaper disintegration to a large extent. When the old newspaper was disintegrated in the conventional pulper at the 4% consistency, the addition of 0.5% enzyme reduced the pulping time from 5 minutes (no enzyme addition) to 30 seconds for a complete disintegration as shown in Table 2.

TABLE 2

| Relation between enzyme addition and disintegration time | | | |
|---|---|---|---|
| enzyme (%) (cellulase) | 0.5 | 0.1 | 0 |
| disintegration time | 30> | 60–120 | 300< |

DE-INKING OF LASER CPO (COMPUTER PRINTOUT) WITH CELLULOLYTIC ENZYME

It is almost impossible to achieve a complete removal of laser beam cured ink particles from the laser CPO wastepaper with conventional de-inking chemicals, because the ink particles are so strongly adhered to the fiber surface that alkali and general de-inking surfactants used in the conventional process are not able to dislodge and disperse the ink in the pulp-water slurry.

Example 2

A sample of laser CPO wastepaper was added to water in a laboratory high consistency pulper to achieve a consistency of 12.5% and a cellulase (enzyme) was added to the water at the dosage level of 0.2% based on the dry weight of paper. At stock water temperature of 20°–35° C., the pulping was carried out for 20 minutes. The completely disintegrated pulp slurry was diluted to 0.5% consistency and then the dispersed ink particles were removed out of the pulp slurry using the laboratory flotation cell in the same way described in Example 1. In this case, to increase the ink removal efficiency and selectivity, a small amount of the conventional fatty acid collector, SERFAX MT-90, 0.3% based on dry weight of wastepaper, was added prior to the air flotation step and the flotation time was 3 minutes.

Comparative Example

To compare to the enzyme de-inked pulp, the conventional de-inked pulp was prepared by the same way, but the following chemicals and conditions were used:

1% NaOH on dry weight of wastepaper 0.1% IGEPAL-660 dispersant 0.8% SERFAX MT-90

50° C. pulping temperature 30 minutes pulping time 220 ppm calcium salt addition to the flotation cell 3 minutes flotation time The brightness and the strength properties of the resulting pulp samples were compared in Table 3.

TABLE 3

Comparison of pulp properties recycled by the method of the present invention and the conventional method.

| | Brightness (%) | Dirt Amount (count/area) | Tensile Index (N.m/g) |
|---|---|---|---|
| enzyme + MT-90 (0.3%) | 79.0 | 450 | 34.3 |
| conventional method + MT-90 (0.8%) | 80.6 | 4,330 | 26.3 |

DE-INKING OF WASTE NEWSPRINT BY PECTINOLYTIC ENZYME

Example 3

As per the method of Example 1, the waste newsprint containing 0.1% of pectinase was soaked for 10 minutes at 40° C. and disintegrated for 5 minutes. The disintegrated pulp was diluted to a consistency of 1%. Ink particles were removed by flotation for 1 minute.

Comparative Example

The procedure of the comparative example of Example 1 above was repeated.

As shown in Table 4, the brightness and the tensile strength of paper sheet prepared by the method of the present invention are improved.

TABLE 4

Comparison of the method of using pectinolytic enzyme with the conventional method

| | Brightness (%) | Tensile Index (N.m/g) |
|---|---|---|
| pectinase enzyme | 44.2 | 33.3 |
| conventional method MT-90 (0.8%) | 38.4 | 32.8 |

The foregoing disclosure and description of the invention is illustrative and explanatory thereof, and various changes in the method steps may be made within the scope of the appended claims without departing from the spirit of the invention.

What is claimed is:

1. A method of deinking waste printed paper, comprising
   a) pulping waste printed paper with an enzyme capable of dislodging ink particles from the waste printed paper in an aqueous medium at a pH between about 3 to less than 8 and resulting from not having added alkali prior to or the de-inking method, and wherein the ink is dislodged from the waste printed paper by action of said enzyme; and
   b) removing dislodged ink particles from the resulting pulp containing medium.

2. The method of claim 1 wherein dislodged ink particles are removed by flotation.

3. The method of claim 1 wherein dislodged ink particles are removed by washing.

4. The method of claim 1 wherein the amount of enzyme used is in the range of about 0.005 to about 5.0 percent-by-weight based on the dry weight of the wastepaper.

5. The method of claim 1 wherein said enzyme is selected from the class consisting of cellulase, hemicellulase, pectinase, other carbohydrases and mixtures thereof.

6. The method of claim 1 wherein said enzyme is a cellulase selected from the group consisting of cellulases derived from *Trichoderma viride*, *Aspergillus niger* and mixtures thereof.

7. The method of claim 1 including controlling the pH of said aqueous medium from about 3 to about 7.

8. The method of claim 1 wherein the pulping occurs at a high consistency of pulp.

9. The method of claim 1 wherein the pulping occurs for a period of less than about 1 hour.

10. The method of claim 1 wherein the temperature of the pulping is in a range of from about 20° C. up to about 60° C.

11. A method of recycling and de-inking waste printed paper, comprising
   a) pulping waste printed paper,
   b) contacting waste printed paper with an enzyme capable of dislodging ink particles from the waste printed paper in an aqueous medium at a pH between about 3 to less than 8 and resulting from not having added alkali prior to or during the de-inking method, and wherein the ink is dislodged from the waste printed paper by action of said enzyme, and
   c) removing dislodged ink particles from the resulting pulp containing medium.

12. The method of claim 11, wherein the enzyme is a cellulase selected from the group of cellulases derived from *Trichoderma viride*, *Aspergillus niger* or mixtures thereof wherein said cellulase is used in an amount between about 0.005 and about 5.0 percent-by-weight based on the dry weight of said waste printed paper, said contacting being carried out at a temperature between about 20° C. and about 60° C.

13. The method of claim 11 wherein the amount of enzyme used is in the range of about 0.005 to about 5.0 percent-by-weight based on the dry weight of the wastepaper.

14. The method of claim 11 wherein the enzyme is selected from the class consisting of cellulase, hemicellulase, pectinase, other carbohydrases and mixtures thereof.

15. The method of claim 11 wherein said enzyme is a cellulase selected from the group consisting of cellulases derived from *Trichoderma viride*, *Aspergillus niger* and mixtures thereof.

16. The method of claim 11 wherein the ink particles are removed by flotation or washing.

17. The method of claim 11 wherein the pH of said aqueous medium is from about 3 to about 7.

18. The method of claim 11 wherein the pulping occurs at a high consistency of pulp.

19. The method of claim 11 wherein the pulping occurs for a period of less than about 1 hour.

20. The method of claim 11 wherein the temperature of the pulping is in a range of from about 20° C. up to about 60° C.

* * * * *

UNITED STATES PATENT AND TRADEMARK OFFICE
CERTIFICATE OF CORRECTION

PATENT NO. : 5,785,809

DATED : July 28, 1998

INVENTOR(S) : Steven Say-kyoun Ow; Tae Jin Eom

It is certified that error appears in the above-identified patent and that said Letters Patent is hereby corrected as shown below:

Claim 1, line 6, please insert "during" prior to the phrase --the de-inking method--

Signed and Sealed this

Eighth Day of December, 1998

Attest:

BRUCE LEHMAN

Attesting Officer

Commissioner of Patents and Trademarks